(12) United States Patent
Shiraishi

(10) Patent No.: US 11,681,130 B2
(45) Date of Patent: Jun. 20, 2023

(54) LENS MIRROR ARRAY AND IMAGE FORMING APPARATUS USING THE LENS MIRROR ARRAY

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 17/343,354

(22) Filed: Jun. 9, 2021

(65) Prior Publication Data

US 2022/0187581 A1 Jun. 16, 2022

(30) Foreign Application Priority Data

Dec. 15, 2020 (JP) .............................. JP2020-207323

(51) Int. Cl.
| | |
|---|---|
| *G02B 17/00* | (2006.01) |
| *H04N 1/028* | (2006.01) |
| *G03G 15/04* | (2006.01) |
| *G03G 15/043* | (2006.01) |
| *G02B 5/10* | (2006.01) |
| *G02B 19/00* | (2006.01) |

(52) U.S. Cl.
CPC ............. *G02B 17/002* (2013.01); *G02B 5/10* (2013.01); *G02B 19/0028* (2013.01); *G02B 19/0066* (2013.01); *G03G 15/0435* (2013.01); *G03G 15/04036* (2013.01); *H04N 1/0285* (2013.01); *H04N 1/02865* (2013.01)

(58) Field of Classification Search
CPC .... G02B 17/002; G02B 5/10; G02B 19/0028; G02B 19/0066; G03G 15/04036; G03G 15/0435; H04N 1/0285; H04N 1/02865
See application file for complete search history.

(56) References Cited

U.S. PATENT DOCUMENTS

| | | | |
|---|---|---|---|
| 9,977,364 B1* | 5/2018 | Shiraishi ................ | G02B 3/005 |
| 10,866,534 B1* | 12/2020 | Shiraishi .............. | G02B 17/002 |
| 2013/0314754 A1* | 11/2013 | Shiraishi .............. | G02B 3/0068 |
| | | | 358/475 |
| 2014/0204474 A1* | 7/2014 | Shiraishi ................ | G03G 13/04 |
| | | | 359/730 |
| 2016/0216634 A1* | 7/2016 | Shiraishi ............ | G03G 15/0409 |
| 2018/0259756 A1 | 9/2018 | Shiraishi | |
| 2019/0052768 A1* | 2/2019 | Shiraishi .............. | H04N 1/0318 |
| 2019/0354035 A1* | 11/2019 | Shiraishi ............ | G03G 15/0409 |
| 2020/0106911 A1* | 4/2020 | Shiraishi ............ | H04N 1/02825 |

(Continued)

*Primary Examiner* — Ryan D Walsh
(74) *Attorney, Agent, or Firm* — Foley & Lardner LLP

(57) ABSTRACT

According to at least one embodiment, a lens mirror array includes a plurality of optical elements. An optical element of the plurality of optical elements includes an incident surface on which light is incident, an emitting surface configured to emit the light incident through the incident surface, at least one reflecting surface reflecting the light incident through the incident surface toward the emitting surface, and a light shielding portion configured to block the light. The incident surface includes an effective surface configured to pass effective light emitted from the emitting surface and a directional surface configured to direct unnecessary light to the light shielding portion.

16 Claims, 13 Drawing Sheets

(56) References Cited

U.S. PATENT DOCUMENTS

| | | | | |
|---|---|---|---|---|
| 2021/0080852 A1* | 3/2021 | Shiraishi | ............ | G02B 19/0028 |
| 2021/0271185 A1* | 9/2021 | Shiraishi | ............ | G02B 19/0028 |
| 2022/0019154 A1* | 1/2022 | Shiraishi | ................ | G02B 5/005 |

* cited by examiner

LENS MIRROR ARRAY AND IMAGE FORMING APPARATUS USING THE LENS MIRROR ARRAY

CROSS-REFERENCE TO RELATED APPLICATION

This application is based upon and claims the benefit of priority from Japanese Patent Application No. 2020-207323, filed on Dec. 15, 2020, the entire contents of which are incorporated herein by reference.

FIELD

Embodiments described herein relate generally to a lens mirror array incorporated into a copying machine, a printer, a scanner, or the like, and an image forming apparatus using the lens mirror array.

BACKGROUND

A document reading device of an image forming apparatus has a lens mirror array for refracting and reflecting light incident from a document surface and condensing the light on a sensor array. In addition, an exposure device that forms an electrostatic latent image on a surface of a photoreceptor drum of the image forming apparatus has a lens mirror array for refracting and reflecting light based on an image signal incident from a light source and condensing the light on the surface of the photoreceptor drum.

The lens mirror array of the exposure device has, for example, a plurality of optical elements that condense light from a plurality of light sources aligned in the main scanning direction on a surface of a photoreceptor drum. The lens mirror array has a structure in which the plurality of optical elements are integrally connected in the main scanning direction. The lens mirror array can be made of, for example, a transparent resin.

Each of the optical elements of the lens mirror array has a light shielding layer on a portion of a surface of the optical element. The light shielding layer blocks light (for example, light that is undesirably incident on an adjacent optical element) that is unnecessary for exposure.

A lens mirror array is usually formed by injection molding. For this reason, in addition to a lens surface and a reflecting surface for guiding effective light required for exposure, each of the optical elements of the lens mirror array has a surface portion that generates stray light that causes noise light. This surface portion generates the stray light that is reflected or refracted at the surface portion, and if the stray light is mixed with the effective light and emitted, the stray light causes a deterioration in image quality. However, if the lens mirror array is formed by injection molding, it is difficult to eliminate the unnecessary surface portion that causes such stray light.

DETAILED DESCRIPTION

The invention provides a lens mirror array capable of effectively blocking stray light that causes noise light and improving optical characteristics and an image formation apparatus using the lens mirror array.

The lens mirror array according to at least one embodiment has a structure in which a plurality of optical elements are arranged. Each of the optical elements has: an incident surface on which light is incident; an emitting surface emitting the light incident through the incident surface; at least one reflecting surface reflecting the light incident through the incident surface toward the emitting surface; and a light shielding portion blocking light. The incident surface includes: an effective surface through which the effective light, out of the light incident on the incident surface, emitted from the emitting surface passes; and a directional surface that enables unnecessary light, out of the light incident on the incident surface, that becomes stray light to be directed to the light shielding portion.

Hereinafter, embodiments of the invention will be described with reference to the drawings.

Figure 1:
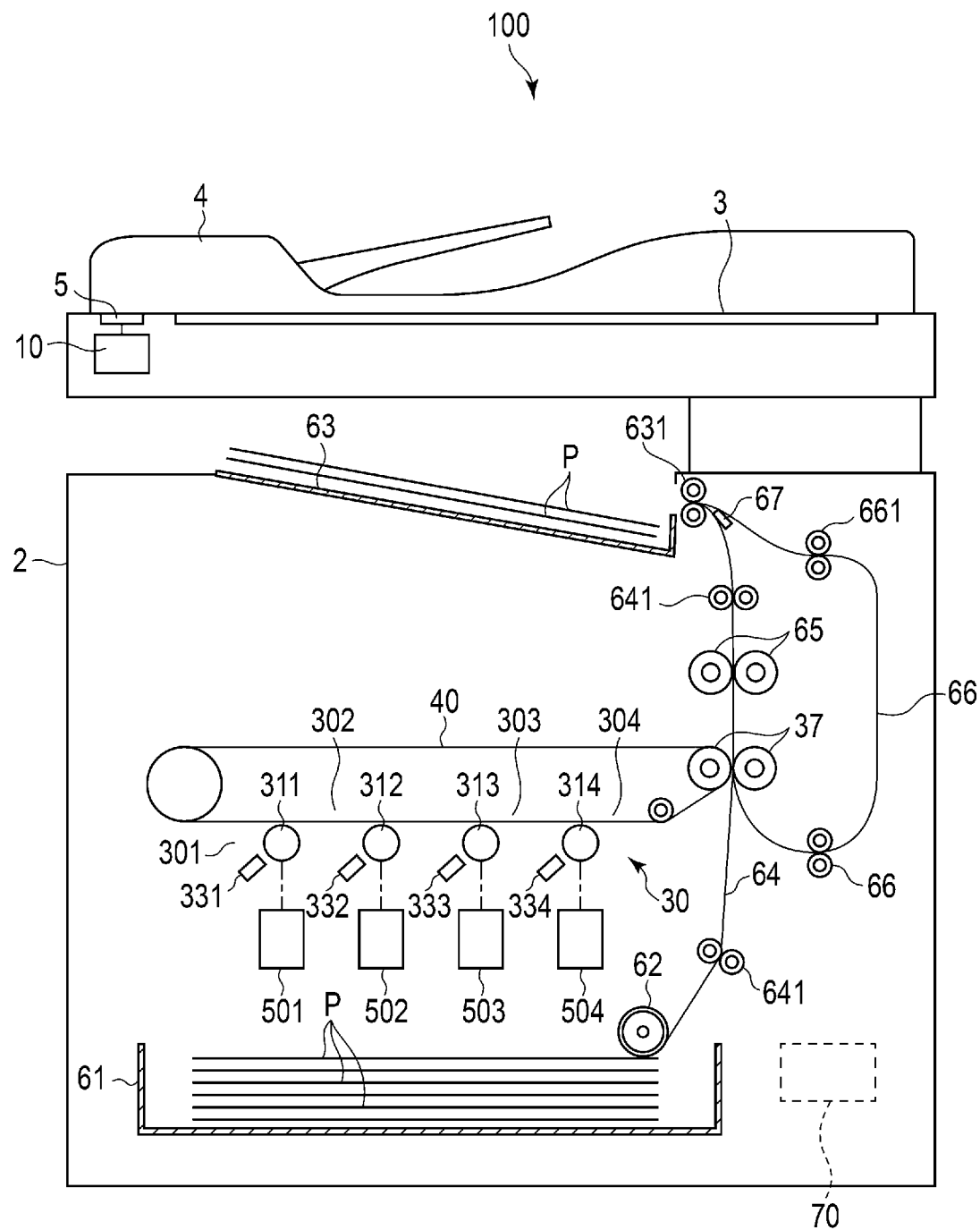
FIG. 1 is a schematic view illustrating a copying machine according to at least one embodiment of the invention.

FIG. 1 is a schematic view illustrating a copying machine 100, which is an embodiment of an image forming apparatus. The copying machine 100 is, for example, a solid-state scanning type LED copying machine having an exposure optical system using a semiconductor light emitting element such as an LED as a light source.

The copying machine 100 has a housing 2. The housing 2 has a transparent platen glass 3 on which a document is set. The copying machine 100 has an automatic document feeder (ADF) 4 on the platen glass 3. The ADF 4 can open and close the platen glass 3. The ADF 4 feeds the document through a document reading position (reading glass 5) described later and also functions as a document pressing cover for pressing the document mounted on the platen glass 3.

Figure 2:
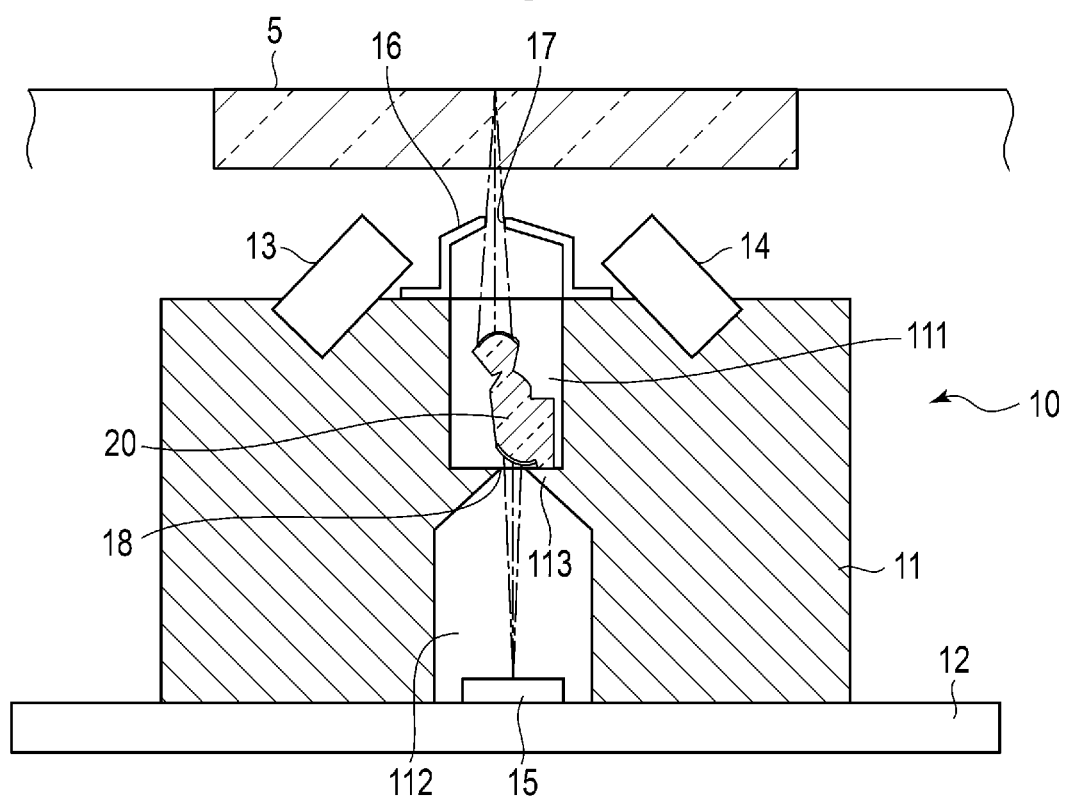
FIG. 2 is a schematic view illustrating a document reading device incorporated into the copying machine of FIG. 1.

The copying machine 100 has a document reading device 10 that reads information written on the document surface, which is the front surface of the document, under the platen glass 3. FIG. 2 is a schematic view illustrating the document reading device 10. The document reading device 10 can be moved along the platen glass 3 in the sub scanning direction (left-right direction in the drawing) by a drive mechanism (not illustrated). In addition, the document reading device 10 can be fixedly arranged under the transparent reading glass 5 (position illustrated in FIG. 1) in parallel to one surface with the platen glass 3.

As illustrated in FIG. 2, the document reading device 10 has a rectangular block-shaped support 11. The support 11 has a long structure extending in the main scanning direction (direction orthogonal to the paper surface) parallel to the rotation axis of the photoreceptor drum described later. The document reading device 10 has a long substrate 12 extending in the main scanning direction and arranged horizontally. The substrate 12 is provided with the support 11 on the upper surface of the substrate. The substrate 12 and the support 11 can move in the sub scanning direction along the platen glass 3.

The support 11 includes two illumination devices 13 and 14 on the upper surface of the platen glass 3 side (reading glass 5 side). Each of the illumination devices 13 and 14 has a long structure extending in the main scanning direction. The illumination devices 13 and 14 are separated from each other in the left-right direction (sub scanning direction) in FIG. 2. The illumination devices 13 and 14 move in the sub scanning direction together with the support 11 to illuminate the document surface of the document mounted on the platen glass 3. Alternatively, the illumination devices 13 and 14 illuminate the document fed along the reading glass 5 through the reading glass 5. The support 11 supports the illumination devices 13 and 14 in an inclined posture where illumination light emitted by the illumination devices 13 and 14 is directed toward a reading region of the document.

The illumination devices 13 and 14 include, for example, a light source in which a plurality of LED elements (not illustrated) are arranged in the main scanning direction and a light guide body (not illustrated) that extends in the main scanning direction. In addition to these, fluorescent tubes, xenon tubes, cold cathode ray tubes, organic ELs, and the like can be used as the illumination devices 13 and 14.

Figure 3:
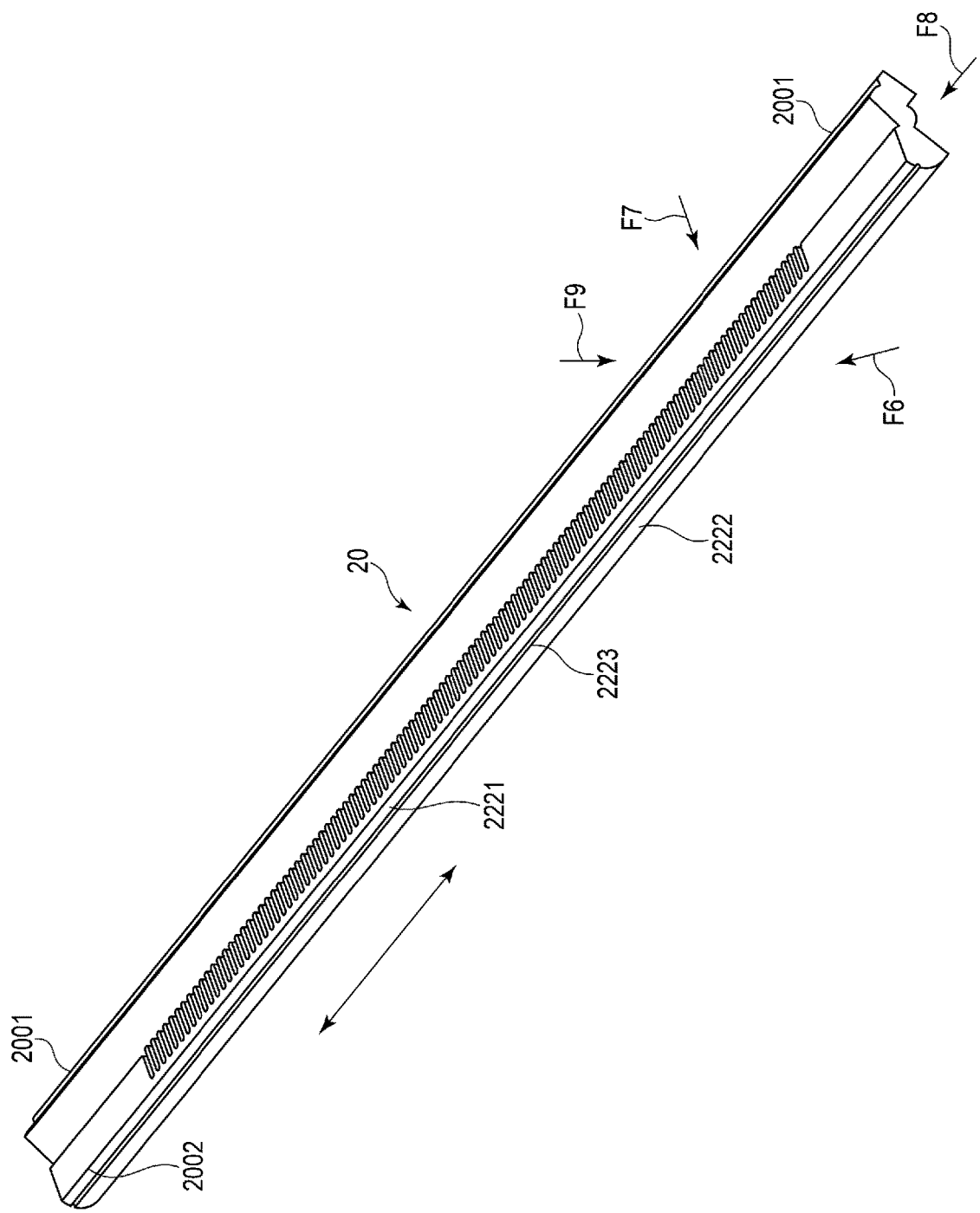
FIG. 3 is an external appearance perspective view illustrating a lens mirror array incorporated into the document reading device of FIG. 2.

The support 11 supports the lens mirror array 20 in the vicinity of the upper surface of the support and between the two illumination devices 13 and 14 described above. FIG. 3 illustrates an external appearance perspective view of the lens mirror array 20. The lens mirror array 20 has a long structure extending in the main scanning direction. The lens mirror array 20 forms an erect image of the document on an image sensor 15 mounted on the substrate 12. The lens mirror array 20 will be described in detail later.

The image sensor 15 (e.g., a photoelectric conversion unit, a photoelectric conversion device) has a long structure extending in the main scanning direction. The image sensor 15 is a line sensor in which a plurality of imaging elements that convert light into an electric signal are arranged in a line shape. The image sensor 15 is one or a plurality of the line sensors. In the image sensor 15, the plurality of imaging elements are arranged side by side in the main scanning direction. The image sensor 15 can be configured with, for example, a charge coupled device (CCD), a complimentary metal oxide semiconductor (CMOS), or other image sensors.

The support 11 is provided with a light shielding member 16 on the upper surface of the support. The light shielding member 16 has a long structure extending in the main scanning direction. The light shielding member 16 can be formed, for example, by bending a long rectangular plate along the longitudinal direction. The light shielding member 16 has a slit 17 that passes the reflected light from the document and guides the reflected light to the lens mirror array 20. The light shielding member 16 has a light shielding material on the surface of the light shielding member. The slit 17 of the light shielding member 16 functions as a diaphragm for passing the reflected light from the document and narrowing the width of the reflected light in the sub scanning direction. The width of the slit 17 in the sub scanning direction and the arrangement position of the slit 17 in the sub scanning direction are the width and the arrangement position where the reflected light from the document passing through the slit 17 is incident on an incident surface 22 described later of the lens mirror array 20.

The support 11 has a room 111 in which the lens mirror array 20 is accommodated and arranged and a room 112 in which the image sensor 15 is accommodated and arranged. In other words, the support 11 has a partition wall 113 that vertically partitions the two chambers 111 and 112. The partition wall 113 has a slit 18 extending in the main scanning direction. The slit 18 allows light emitted from a later-described emitting-side lens surface 25 of the lens mirror array 20 to pass through, and defines the width of the passing light in the sub scanning direction. Accordingly, the slit 18 blocks unnecessary light and stray light, which are unnecessary for reading the document, at the edge of the slit 18.

For example, if the document is fed by the ADF 4 in the state illustrated in FIGS. 1 and 2 where the document reading device 10 is fixed under the reading glass 5, the illumination devices 13 and 14 illuminate the document through the reading glass 5. The reflected light from the document is incident on the lens mirror array 20 through the slit 17 of the light shielding member 16. The lens mirror array 20 reflects and condenses the reflected light from the document as described later and emits the light reflected from the document toward the image sensor 15 through the slit 18. The image sensor 15 receives the reflected light from the document at an imaging point, performs photoelectric conversion, and outputs an image signal.

At this time, the document reading device 10 reads the erect image of the document passing on the reading glass 5 line by line along the main scanning direction. The document reading device 10 can acquire an image of the entire document (for a plurality of lines) by passing the document through the reading glass 5 in the sub scanning direction. Alternatively, even if the document is set on the platen glass 3 and the document reading device 10 is moved along the platen glass 3 in the sub scanning direction, similarly, the document reading device 10 can acquire the image of the entire document (for a plurality of lines).

As illustrated in FIG. 1, the copying machine 100 has an image forming unit 30 (e.g., an image forming device) at substantially the center of the housing 2. The copying machine 100 has an intermediate transfer belt 40 above the image forming unit 30. The image forming unit 30 includes a yellow image forming unit 301 (e.g., a yellow image forming device), a magenta image forming unit 302 (e.g., a magenta image forming device), a cyan image forming unit 303 (e.g., a cyan image forming device), and a black image forming unit 304 (e.g., a black image forming device) along a traveling direction of the intermediate transfer belt 40. Since the image forming units 301, 302, 303, and 304 of each color have substantially the same structure, the black image forming unit 304 will be described herein as a representative, and the detailed description of the image forming units 301, 302, and 303 of other colors will be omitted.

Figure 4:
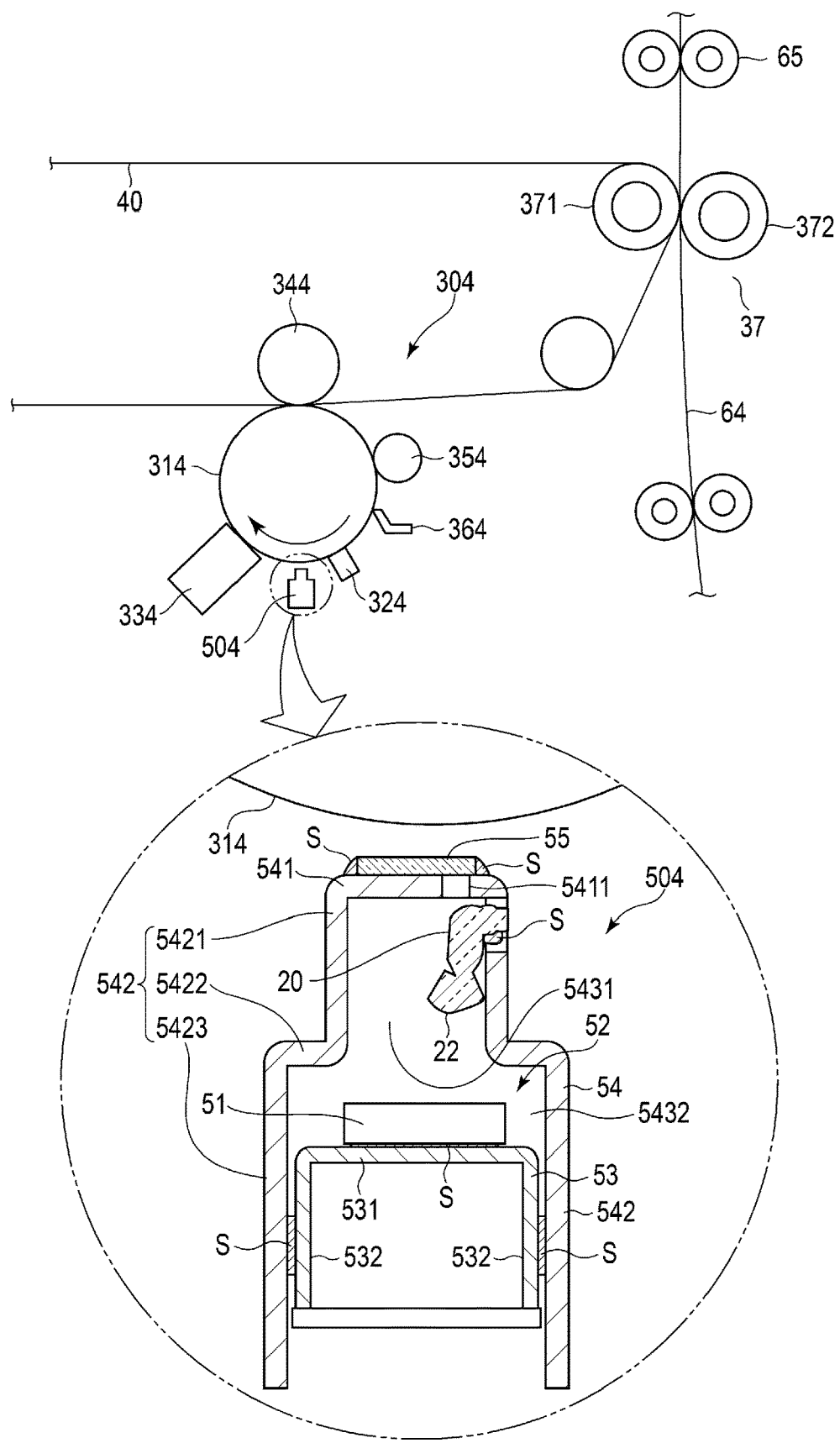
FIG. 4 is a partially enlarged schematic view illustrating an enlarged exposure device of an image forming unit incorporated into the copying machine of FIG. 1.

FIG. 4 is a schematic view illustrating the black image forming unit 304 and a peripheral structure of the black image forming unit. The black image forming unit 304 includes a photoreceptor drum 314, a charger 324, an exposure device 504, a developer 334 (developing device), a primary transfer roller 344, a cleaner 354, and a blade 364. FIG. 4 includes an enlarged view of the exposure device 504.

The photoreceptor drum 314 has a rotation axis provided extending in the main scanning direction orthogonal to the paper surface. The photoreceptor drum 314 has an outer peripheral surface that is in contact with the surface (outer surface) of the intermediate transfer belt 40. The photoreceptor drum 314 rotates so that the outer peripheral surface moves in the same direction at the same speed as the intermediate transfer belt 40. A drive mechanism (not illustrated) of the image forming unit 30 rotates the photoreceptor drum 314 in the direction of the arrow (clockwise direction) at the same speed as the intermediate transfer belt 40.

The primary transfer roller 344 faces the upper side of the photoreceptor drum 314 with the intermediate transfer belt 40 interposed between the primary transfer roller and the photoreceptor drum. The primary transfer roller 344 has a rotation axis extending in the main scanning direction. The primary transfer roller 344 has an outer peripheral surface that is in contact with a back surface (inner surface) of the intermediate transfer belt 40. That is, the intermediate transfer belt 40 travels between the photoreceptor drum 314 and the primary transfer roller 344.

The charger 324 uniformly charges the surface of the photoreceptor drum 314. The exposure device 504 irradiates the surface of the photoreceptor drum 314 with exposure light based on the color-separated black image signal and forms an electrostatic latent image based on the black image signal on the surface of the photoreceptor drum 314. The developer 334 supplies black toner to the electrostatic latent image formed on the surface of the photoreceptor drum 314 and forms a black toner image on the surface of the photoreceptor drum 314.

The primary transfer roller 344 transfers (e.g., superimposes) the black toner image formed on the surface of the photoreceptor drum 314 to toner images of other colors on the intermediate transfer belt 40. The cleaner 354 and the blade 364 remove the toner remaining on the surface of the photoreceptor drum 314. Each of the color toner images transferred (e.g., superimposed) to the surface of the intermediate transfer belt 40 moves through between a pair of secondary transfer rollers 371 and 372 (in the following description, sometimes collectively referred to as a transfer roller pair 37) by the traveling of the intermediate transfer belt 40.

As illustrated enlarged in FIG. 4, the exposure device 504 of the black image forming unit 304 includes a lens mirror array 20, a light source unit 52 (e.g., a light source device), and a housing 54. The components 20, 52, and 54 of the exposure device 504 have a long structure extending in the main scanning direction parallel to the rotation axis of the photoreceptor drum 314 and have substantially the same length in the main scanning direction as the photoreceptor drum 314. The exposure device 504 faces separately the lower side of the photoreceptor drum 314 in the drawing.

The housing 54 of the exposure device 504 accommodates and arranges the lens mirror array 20 having the same structure as the lens mirror array 20 of the document reading device 10 described above inside the housing. The housing 54 holds the lens mirror array 20 in the direction that the top and bottom of the lens mirror array 20 of the document reading device 10 are reversed. In addition, the housing 54 holds the light source unit 52 inside the housing. The housing 54 fixes a light source 51, which will be described later, of the light source unit 52 and the lens mirror array 20 in a state of being position-aligned with each other.

The housing 54 integrally has a top wall 541 extending in the main scanning direction and two side walls 542 and 542. The top wall 541 includes a slit 5411 extending in the main scanning direction. The housing 54 can be formed, for example, by shaping a single rectangular sheet metal. The top wall 541 has a long rectangular plate-shaped structure. The top wall 541 of the housing 54 faces the surface of the photoreceptor drum 314.

Each of the two side walls 542 and 542 of the housing 54 has an upper wall portion 5421, a shoulder wall portion 5422, and a lower wall portion 5423. The two side walls 542 have shapes in which the same structures are reversed left and right. In addition to this, the housing 54 may have two end walls (not illustrated) arranged at both ends in the main scanning direction.

The upper wall portions 5421 of the side walls 542 are integrally connected to both end edges of the top wall 541 in the sub scanning direction. The upper wall portion 5421 extends in a direction opposite to the direction toward the photoreceptor drum 314 from the end edge of the top wall 541 in the sub scanning direction and is substantially orthogonal to the top wall 541. The shoulder wall portion 5422 is integrally connected to the end edge of the upper wall portion 5421 separated from the top wall 541. The shoulder wall portion 5422 extends from the end edge of the upper wall portion 5421 in a direction separated from each other outward in the sub scanning direction and is substantially orthogonal to the upper wall portion 5421. The lower wall portion 5423 is integrally connected to the end edge of the shoulder wall portion 5422 separated from the upper wall portion 5421. The lower wall portion 5423 extends from the end edge of the shoulder wall portion 5422 in a direction opposite to the direction toward the photoreceptor drum 314 and is substantially orthogonal to the shoulder wall portion 5422.

An accommodation space 5431 having a relatively small width along the sub scanning direction between the two upper wall portions 5421 and an accommodation space 5432 having a relatively large width along the sub scanning direction between the two lower wall portions 5423 exist inside the housing 54. The lens mirror array 20 is accommodated and arranged in the accommodation space 5431 having a relatively small width and being close to the photoreceptor drum 314, and the light source unit 52 is accommodated and arranged in the accommodation space 5432 having a relatively large width and being away from the photoreceptor drum 314.

The slit 5411 provided in the top wall 541 of the housing 54 has a width in the sub scanning direction through which light required for exposure can pass. The slit 5411 regulates the width of the passing light in the sub scanning direction and blocks the unnecessary light and the stray light unnecessary for exposure at the edge of the slit 5411. The top wall 541 is provided with a long rectangular plate-shaped protective glass 55 having a size covering the entire length of the slit 5411 on the outer surface on the photoreceptor drum 314 side. The protective glass 55 is fixed to the outer surface of the top wall 541 by an adhesive S to prevent toner, dust, and the like from adhering to the lens mirror array 20.

The housing 54 accommodates the lens mirror array 20 in the accommodation space 5431 in a state of extending in the main scanning direction. The adhesive S fixes the lens mirror array 20 on the inner surface of the one upper wall portion 5421 of the housing 54. The lens mirror array 20 reflects and condenses the light incident from the light source 51 of the light source unit 52 as described later to emit the light toward the surface of the photoreceptor drum 314. The lens mirror array 20 will be described in detail later.

The light source unit 52 has a light source 51 and a holder 53. The holder 53 has a substantially U-shaped cross section extending in the main scanning direction. The holder 53 has a top wall 531 to which the light source 51 is attached. The top wall 531 has a long rectangular plate shape. The holder 53 has two side walls 532 continuous with the end edge of the top wall 531 in the sub scanning direction. Each of the side walls 532 has a long rectangular plate shape. The two side walls 532 extend from the end edge of the top wall 531 in a direction substantially orthogonal to the side opposite to the light source 51. The holder 53 can be formed, for example, by shaping a rectangular plate-shaped sheet metal. The holder 53 is fixed to the housing 54 by adhering the outer surfaces of the two side walls 532 of the holder 53 to the inner surface of the lower wall portion 5423 of the housing 54 with the adhesive S, respectively.

The top wall 531 of the holder 53 is provided with a light source 51 on the upper surface (the surface on the lens mirror array 20 side) of the top wall. The adhesive S fixes the light source 51 on the upper surface of the top wall 531. In the light source 51, for example, the plurality of light emitting elements (not illustrated) arranged side by side in the main scanning direction are mounted in a line shape on the surface of a substrate (not illustrated) or the surface of a glass plate. The light source 51 has the plurality of light emitting elements arranged side by side in a line shape of one line or a plurality of lines.

The light source 51 emits light based on black image data (image signal) obtained by color-separating image data acquired by the document reading device 10 or image data acquired through an external device such as a personal computer (not illustrated). The plurality of light emitting elements of the light source 51 are, for example, LEDs or OLEDs that emit or extinguish light based on the image data.

The light emitted from the light source 51 is incident on the incident surface 22 described later of the lens mirror array 20 arranged in the accommodation space 5431. The lens mirror array 20 reflects and condenses the light from the light source 51 and emits the light through the emitting-side lens surface 25 described later. The photoreceptor drum 314 receives the light emitted from the lens mirror array 20 and guided through the slit 5411 and the protective glass 55.

At this time, the photoreceptor drum 314 rotates, and the exposure device 504 writes the electrostatic latent image on the surface of the photoreceptor drum 314 line by line along the main scanning direction. Then, by rotating the photoreceptor drum 314 by a certain amount, the exposure device 504 forms a black electrostatic latent image color-separated corresponding to the entire image of the document on the surface of the photoreceptor drum 314.

As illustrated in FIG. 1, the copying machine 100 has the transfer roller pair 37 that transfers the toner images of the colors, which are superimposedly transferred to the surface of the intermediate transfer belt 40, to the paper P. As illustrated in FIG. 4, one transfer roller 371 (on the left side in the drawing) is one of the rollers around which the intermediate transfer belt 40 is wound. The other transfer roller 372 (on the right side in the drawing) faces one transfer roller 371 with an intermediate transfer belt 40 interposed between the transfer rollers. The toner images of the colors superimposedly transferred to the surface of the intermediate transfer belt 40 pass through the nip of the transfer roller pair 37 by the traveling of the intermediate transfer belt 40.

The copying machine 100 includes a paper feed cassette 61 in which a plurality of sheets P having a predetermined size are superimposedly accommodated in the vicinity of the lower end of the housing 2. For example, the paper feed cassette 61 can be pulled out from the front surface of the housing 2 and can be stored in the housing 2. The copying machine 100 includes a pickup roller 62 above the right end of the paper feed cassette 61 in the drawing, which picks up the uppermost paper P in the stacking direction among the paper P accommodated in the paper feed cassette 61. The pickup roller 62 picks up the paper P from the paper feed cassette 61 one by one by allowing the peripheral surface of the pickup roller to be in contact with the paper P and rotating the peripheral surface.

The copying machine 100 includes a paper discharge tray 63 above the inside of the housing 2. The paper discharge tray 63 is arranged under the platen glass 3 and discharges the image-formed paper P into a body of the copying machine 100. The copying machine 100 has a longitudinal conveyance path 64 between the pickup roller 62 and the paper discharge tray 63 for vertically conveying the paper P picked up from the paper feed cassette 61 toward the paper discharge tray 63 in the longitudinal direction. The longitudinal conveyance path 64 extends through the nip of the transfer roller pair 37 and includes a plurality of convey roller pairs 641 and a conveying guide (not illustrated). The copying machine 100 is provided with a paper discharge roller pair 631 for discharging the paper P to the paper discharge tray 63 at the end of the longitudinal conveyance path 64. The paper discharge roller pair 631 can rotate in both forward and backward directions.

The copying machine 100 includes a fixing roller pair 65 on the longitudinal conveyance path 64 on the downstream side (upper side in the drawing) of the transfer roller pair 37. The fixing roller pair 65 heats and pressurizes the paper P conveyed through the longitudinal conveyance path 64 and fixes the toner image transferred to the front surface of the paper P on the front surface of the paper P.

The copying machine 100 has a reserving conveyance path 66 for reserving front and back surfaces of the paper P of which the image is formed on the one surface and feeding the paper to the nip of the transfer roller pair 37. The reserving conveyance path 66 has a plurality of convey roller pairs 661 and a conveying guide (not illustrated) to convey the paper P by sandwiching and rotating the paper P. The copying machine 100 has a gate 67 on the upstream side of the paper discharge roller pair 631 to switch a conveyance destination of the paper P between the longitudinal conveyance path 64 and the reserving conveyance path 66.

The copying machine 100 rotates the pickup roller 62 to pick up the paper P from the paper feed cassette 61. The copying machine 100 rotates the plurality of convey roller pairs 641 to convey the paper P picked up from the paper feed cassette 61 toward the paper discharge tray 63 via the longitudinal conveyance path 64. At this time, the copying machine 100 feeds the toner images of each color transferred and formed on the surface of the intermediate transfer belt 40 to the nip of the transfer roller pair 37 in accordance with the timing of conveying the paper P. Then, the copying machine 100 applies a transfer voltage to the paper P from the transfer roller pair 37 to transfer the toner image of each color to the front surface of the paper P.

In this way, the copying machine 100 feeds the paper P, to which the toner image is transferred, to the nip between the fixing roller pairs 65 to heat and pressurize and melt the toner image to press the tonner image against the front surface of the paper P, so that the toner image is fixed on the paper P. The copying machine 100 discharges the paper P, on which the image formed in this manner, to the paper discharge tray 63 through the paper discharge roller pair 631.

At this time, if a double-sided mode in which an image is also formed on the back surface of the paper P is selected, the copying machine 100 switches the gate 67 to the reserving conveyance path 66 at the timing immediately before a rear end of the paper P discharged toward the paper discharge tray 63 in the discharging direction passes through the nip of the paper discharge roller pair 631. Then, after that, the copying machine 100 reverses the paper discharge roller pair 631 and conveys the paper P in a switch-back manner. Accordingly, the copying machine 100 can direct the rear end of the paper P toward the reserving conveyance path 66, reverse the front and back surfaces of the paper P, and feed the paper P back into the nip of the transfer roller pair 37.

Furthermore, the copying machine 100 forms the toner image based on the image data formed on the back surface of the paper P on the surface of the intermediate transfer belt 40 and sends the toner image to the nip of the transfer roller pair 37 by allowing the intermediate transfer belt 40 holding the toner image of each color to travel. Then, the copying machine 100 transfers and fixes the toner image to the back surface of the paper P of which front and back surfaces are reversed as described above and discharges the paper to the paper discharge tray 63 through the paper discharge roller pair 631.

The copying machine 100 has a control unit 70 (e.g., a controller) that controls operations of each of the above-mentioned mechanisms. The control unit 70 includes a processor such as a CPU and a memory. The control unit 70 implements various processing functions by executing a program stored in the memory by the processor. The control unit 70 acquires an image from the document by controlling the document reading device 10. In addition, the control unit 70 forms the image on the front surface of the paper P by controlling the image forming unit 30. For example, the control unit 70 inputs the image data read by the document reading device 10 to the image forming unit 30. The control unit 70 controls the operations of the plurality of convey roller pairs 641 and 661 to convey the paper P through the longitudinal conveyance path 64 and the reserving conveyance path 66.

Figure 5:
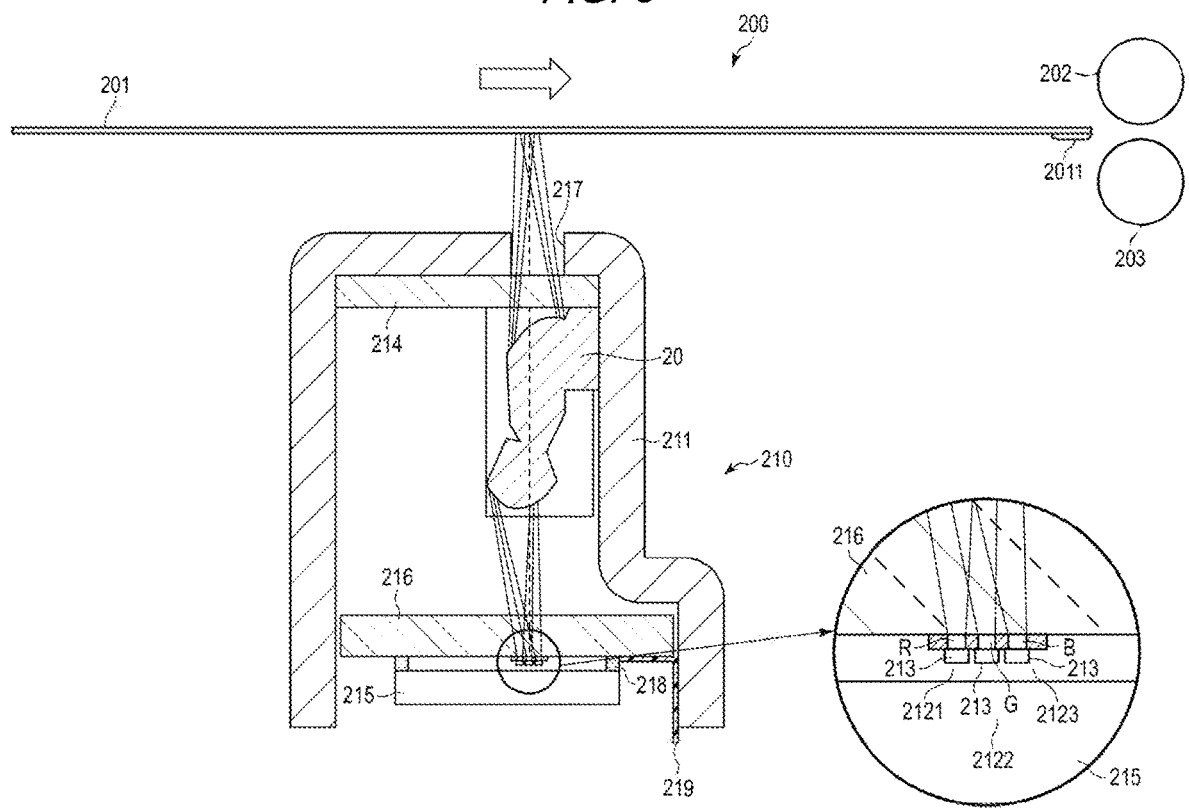
FIG. 5 is a schematic view illustrating main components of a printer according to another embodiment of the invention.

FIG. 5 is a schematic view illustrating main components of a printer 200, which is another embodiment of the image forming apparatus. The printer 200 is, for example, a printer incorporated into an instant camera, a printer for instant photography that develops an image imaged by a digital camera, or the like.

The printer 200 has a conveying mechanism (not illustrated) that conveys a photosensitive medium 201, such as a silver halide photographic film, in the direction of the arrow (right direction in FIG. 5). The conveying mechanism conveys the photosensitive medium 201 in a horizontal posture. The photosensitive medium 201 is provided with a containing portion 2011 containing a developing agent on the front end side in the conveying direction. The printer 200 includes a pair of pressing rollers 202 and 203 that sandwich and press the photosensitive medium 201 on a conveyance path for conveying the photosensitive medium 201 to sealing-break the containing portion 2011. The pair of pressing rollers 202 and 203 have a length exceeding the width in the direction orthogonal to the conveying direction of the photosensitive medium 201.

The conveying mechanism conveys the photosensitive medium 201 through between the pair of pressing rollers 202 and 203. At least one of the pressing rollers 202 and 203 is forced toward the other by a spring or the like (not illustrated), and thus, the pressing rollers 202 and 203 press each other in a direction approaching each other. If the photosensitive medium 201 is conveyed through between the pair of pressing rollers 202 and 203, the pair of pressing rollers 202 and 203 convey the photosensitive medium 201 while flattening the photosensitive medium 201. Accordingly, the containing portion 2011 of the photosensitive medium 201 is flattened and sealing-broken by the pair of pressing rollers 202 and 203, and the photosensitive medium 201 is further conveyed to spread the developing agent over the entire surface of the photosensitive medium 201.

The printer 200 includes an exposure device 210 on the upstream side of the pair of pressing rollers 202 and 203 along the conveying direction for conveying the photosensitive medium 201. The printer 200 includes the exposure device 210 that faces separately the lower side of the conveyance path in the drawing. The exposure device 210 irradiates the photosensitive surface of the photosensitive medium 201 conveyed via the conveyance path with exposure light of three colors (RGB) in which image data is color-separated to form a color latent image on the photosensitive medium 201.

The exposure device 210 has a support 211 provided extending in a width direction (direction orthogonal to the paper surface) orthogonal to the conveying direction of the photosensitive medium 201. The support 211 supports the lens mirror array 20 having the same structure as the lens mirror array 20 described above. The lens mirror array 20 is provided extending in the width direction orthogonal to the paper surface and reflects and condenses the light incident from the light sources 2121, 2122, and 2123 as described later, to emit the light toward the photosensitive surface of the photosensitive medium 201. The lens mirror array 20 will be described in detail later.

The light sources 2121, 2122, and 2123 are, for example, organic light emitting diodes (OLEDs) in which filters and apertures arranged in a staggered manner in two rows for each color are arranged with respect to a white organic EL element 213. The white organic EL element 213 is attached to a transparent glass 216. In addition, the OLED is shielded from the outside air so as not to absorb moisture by the transparent glass 216, a sealing plate 215, and an adhesive 218 applied on the outer peripheral sealing plate 215 and provided in a frame shape to seal the space between the transparent glass 216 and the sealing plate 215. The white organic EL element 213 is connected to a flexible substrate 219 and is supplied with power from a circuit on the flexible substrate 219. The support 211 supports the transparent glass 216 between the lens mirror array 20 and the light sources 2121, 2122, and 2123.

In addition, the support 211 supports the transparent protective glass 214 on the photosensitive medium 201 side of the lens mirror array 20. The protective glass 214 protects the lens mirror array 20 and prevents dust from adhering to the lens mirror array 20. The support 211 has a slit 217 extending in the width direction on the light emitting side of the protective glass 214. The slit 217 has a width for passing a light component necessary for exposure and blocks the light unnecessary for exposure by an edge of the slit 217.

The printer 200 conveys the photosensitive medium 201 by a conveying mechanism and irradiates the photosensitive medium 201 with the light from the light sources 2121, 2122, and 2123 though the lens mirror array 20 to form the color latent image on the photosensitive medium 201. In addition, the printer 200 conveys the photosensitive medium 201 by the conveying mechanism, and feeds the photosensitive medium 201 between the pair of pressing rollers 202 and 203. The pair of pressing rollers 202 and 203 flatten and sealing-break the containing portion 2011 of the photosensitive medium 201 to supply the developing agent to the photosensitive medium 201. Accordingly, the color latent image of the photosensitive medium 201 is developed, and a color image is formed on the photosensitive medium 201.

Hereinafter, the lens mirror array 20 described above will be described with reference to FIGS. 6 to 10 together with FIG. 3. The lens mirror array 20 according to at least one embodiment has a common structure capable of being used by being incorporated into the document reading device 10 and exposure devices 501, 502, 503, and 504 of the copying machine 100 described above and capable of being also used by being incorporated into the exposure device 210 of the printer 200.

Figure 6:
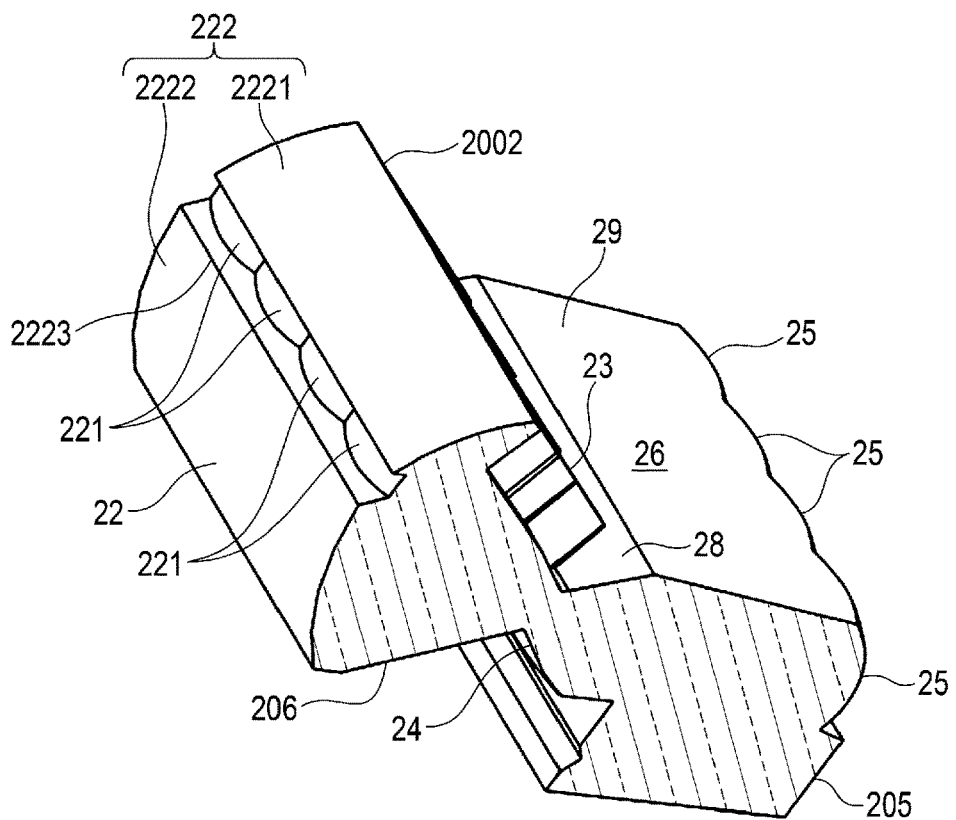
FIG. 6 is a partially enlarged perspective view of a portion of the lens mirror array of FIG. 3 as viewed from a direction of arrow F6.
Figure 7:
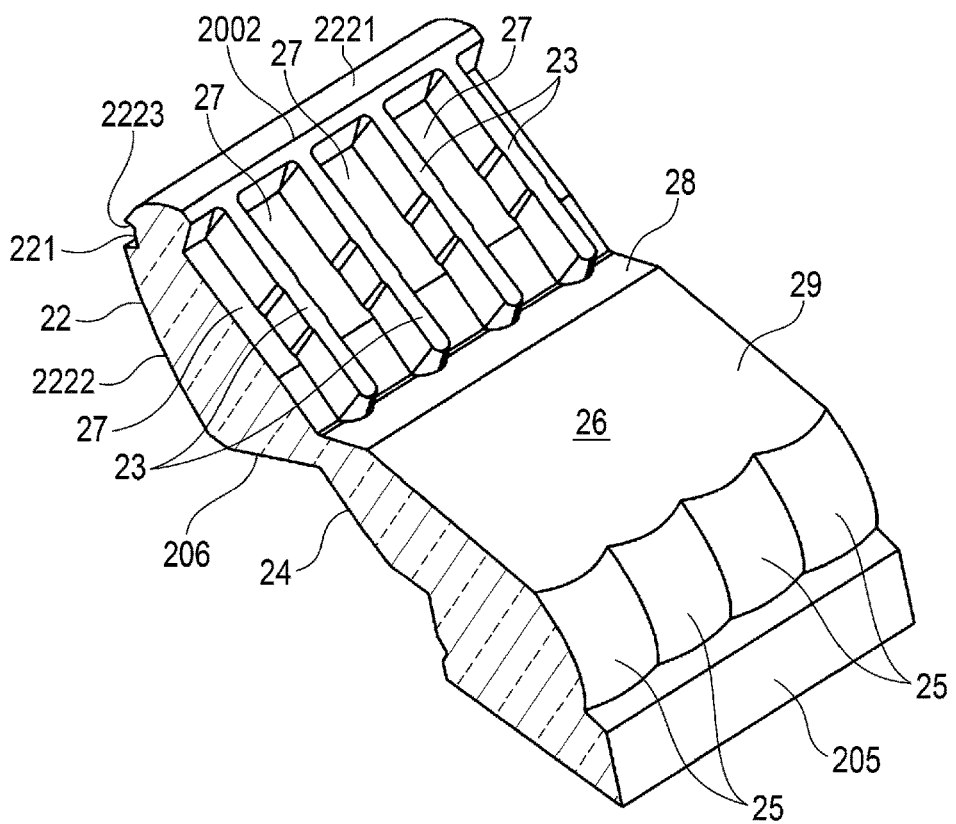
FIG. 7 is a partially enlarged perspective view of a portion of the lens mirror array of FIG. 3 as viewed from the direction of arrow F7.
Figure 8:
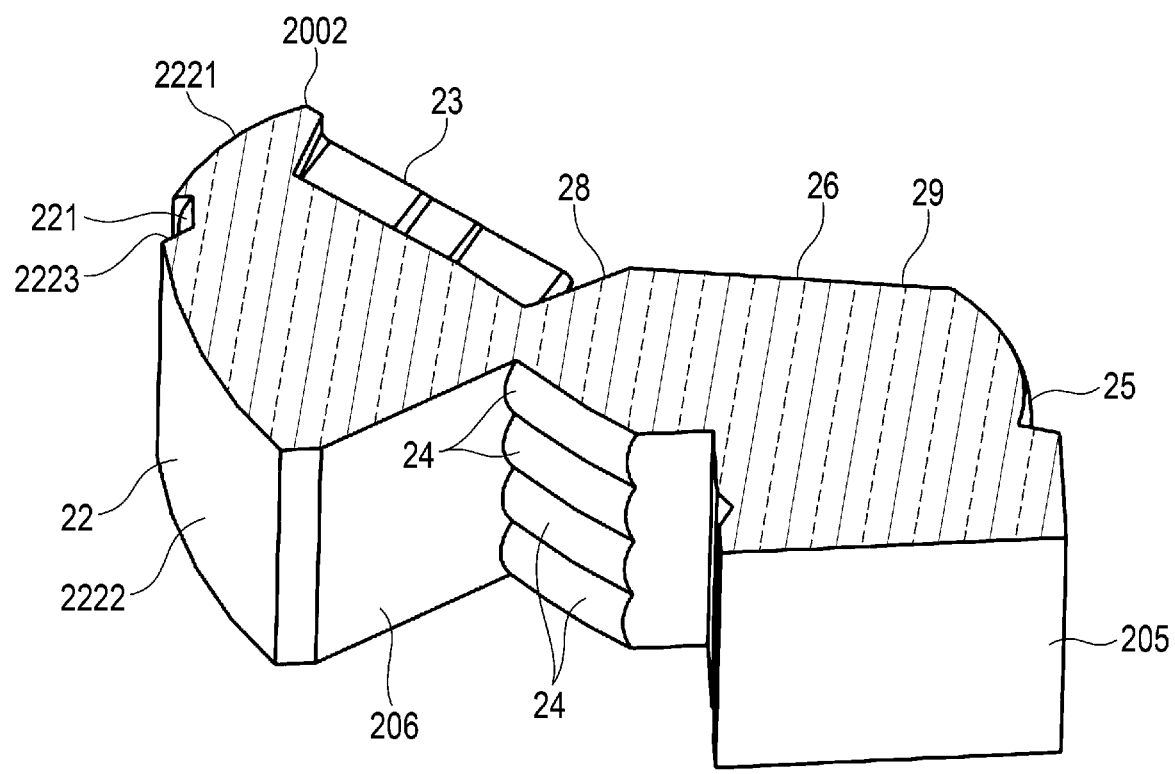
FIG. 8 is a partially enlarged perspective view of a portion of the lens mirror array of FIG. 3 as viewed from a direction of arrow F8.
Figure 9:
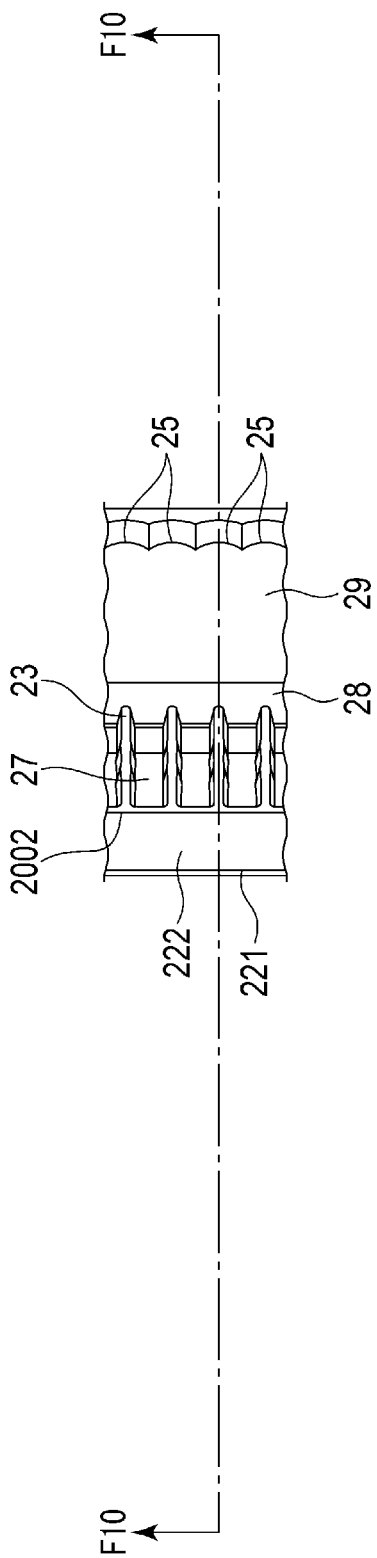
FIG. 9 is a partially enlarged plan view of a portion of the lens mirror array of FIG. 3 as viewed from a direction of arrow F9.
Figure 10:
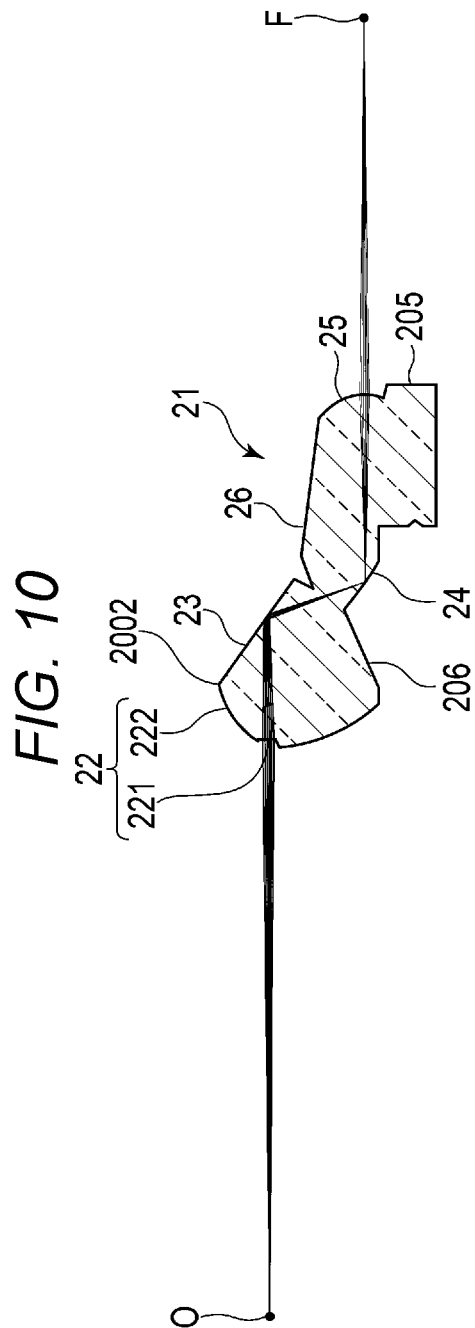
FIG. 10 is a cross-sectional view of the lens mirror array of FIG. 9 taken along line F10-F10.

FIG. 3 is an external appearance perspective view of the lens mirror array 20. FIG. 6 is a partially enlarged perspective view of four consecutive optical elements 21 in the main scanning direction of the lens mirror array 20 as viewed from the direction of arrow F6 in FIG. 3. FIG. 7 is a partially enlarged perspective view of four consecutive optical elements 21 of the lens mirror array 20 as viewed from the direction of arrow F7 in FIG. 3. FIG. 8 is a partially enlarged perspective view of four consecutive optical elements 21 of the lens mirror array 20 as viewed from the direction of arrow F8 in FIG. 3. FIG. 9 is a plan view of four consecutive optical elements 21 of the lens mirror array 20 as viewed from the direction of arrow F9 in FIG. 3. FIG. 10 is a cross-sectional view in which the center of one optical element 21 of the lens mirror array 20 in the main scanning direction is cut along a plane (indicated by F10-F10 in FIG. 9) orthogonal to the longitudinal direction of the lens mirror array 20.

The lens mirror array 20 can be incorporated into the document reading device 10, the exposure devices 501, 502, 503, and 504, and the exposure device 210 of the printer 200 in a posture where the longitudinal direction of the lens mirror array is along the main scanning direction (arrow direction in FIG. 3). The lens mirror array 20 has a structure in which a plurality (only four are illustrated in FIGS. 6 to 9) of transparent optical elements 21 having substantially the same shape are integrally arranged side by side in the main scanning direction. In addition, in addition to the plurality of optical elements 21, the lens mirror array 20 has an extension portion 2001 (FIG. 3) which can be in contact with both ends of the lens mirror array in the longitudinal direction if an operator grips the lens mirror array 20 with his or her fingers. In at least one embodiment, the lens mirror array 20 is formed by integrally molding a transparent resin. The lens mirror array 20 may be made of a transparent glass.

As illustrated in FIG. 10, each of the optical elements 21 of the lens mirror array 20 guides diffused light from an object point O so as to form an image on an imaging point F on the image plane (not illustrated). One optical element 21 forms an image of light from a plurality of the object points O aligned in the main scanning direction on an image plane. For example, one optical element 21 forms an image of light from the object point O, which is arranged within a width of 2 to 3 times the pitch of the optical element 21 in the main scanning direction, on the image plane. Each of the optical elements 21 of the lens mirror array 20 reflects the incident light twice and emits the reflected light to form the erect image of the object point O at the imaging point F.

For example, if the lens mirror array 20 is incorporated into the document reading device 10 illustrated in FIG. 2, the plurality of optical elements 21 form an image of the reflected light from the document on the light receiving surface of the image sensor 15. In addition, if the lens mirror array 20 is incorporated into the exposure device 504 illustrated in FIG. 4, the plurality of optical elements 21 form an image of the light from the light source 51 on the surface of the photoreceptor drum 314. In addition, if the lens mirror array 20 is incorporated into the printer 200 illustrated in FIG. 5, the plurality of optical elements 21 form an image of the light from the light sources 2121, 2122, and 2123 on the photosensitive surface of the photosensitive medium 201.

Hereinafter, the structure of the lens mirror array 20 according to at least one embodiment will be described in detail.

Each of the optical elements 21 of the lens mirror array 20 has the incident surface 22, an upstream-side reflecting surface 23, a downstream-side reflecting surface 24, the emitting-side lens surface 25 (emitting surface), and a light shielding film 26 (light shielding portion) on the surface of the optical element. The incident surface 22 includes an incident-side lens surface 221 (effective surface) and a directional lens surface 222 (directional surface). The directional lens surface 222 includes a first pillar surface 2221 and a second pillar surface 2222. The incident-side lens surface 221, the first pillar surface 2221, the second pillar surface 2222, the downstream-side reflecting surface 24, and the emitting-side lens surface 25 are free curved surfaces that are convex outward. The upstream-side reflecting surface 23 is a planar surface.

The incident-side lens surface 221 passes effective light (for example, light required for exposure) emitted from the emitting-side lens surface 25 out of the light incident on the incident surface 22. The first and second pillar surfaces 2221 and 2222 of the directional lens surface 222 direct unnecessary light, which is stray light, out of the light incident on the incident surface 22 toward the light shielding film 26. The incident surface 22 may include a surface other than the incident-side lens surface 221 and the directional lens surface 222.

The first and second pillar surfaces 2221 and 2222 are pillar surfaces formed by moving a line in which each of the surfaces intersects a plane orthogonal to the main scanning direction in the main scanning direction. For this reason, each of the first and second pillar surfaces 2221 and 2222 of the plurality of optical elements 21 constitutes one surface connected over the entire length of the lens mirror array 20. In at least one embodiment, for the clarity, it is assumed that the first and second pillar surfaces 2221 and 2222 are portions of cylindrical surfaces having different curvatures.

The optical element 21 has a groove 2223 extending in the main scanning direction between the first pillar surface 2221 and the second pillar surface 2222. The grooves 2223 of the plurality of optical elements 21 form one groove connected in the main scanning direction of the lens mirror array 20. Each of the optical elements 21 has the incident-side lens surface 221 at the bottom of the groove 2223. The incident-side lens surface 221 of each of the optical elements 21 is a free curved surface that condenses effective light, and has a curved surface having a shape different from those of the first pillar surface 2221 and the second pillar surface 2222. The width and depth of the groove 2223 are determined by the shape and size of the incident-side lens surface 221. The groove 2223 is not an essential configuration for the invention.

An alignment direction of the first pillar surface 2221, the groove 2223 (that is, the incident-side lens surface 221), and the second pillar surface 2222 is a direction intersecting the main scanning direction. That is, the first pillar surface 2221 is adjacent to one side of the incident-side lens surface 221 in the direction intersecting the main scanning direction in which the plurality of optical elements 21 are arranged. The second pillar surface 2222 is adjacent to the other side of the incident-side lens surface 221 in the direction intersecting the main scanning direction in which the plurality of optical elements 21 are arranged.

The optical element 21 has a ridge portion 2002 extending in the main scanning direction between the first pillar surface 2221 of the directional lens surface 222 and the upstream-side reflecting surface 23. The ridge portions 2002 of the plurality of optical elements 21 are connected in a straight line over the entire length of the lens mirror array 20.

As illustrated in FIG. 7, the upstream-side reflecting surfaces 23 of the plurality of optical elements 21 form a comb-teeth-shaped planar surface in which the end portions on the ridge portion 2002 side are connected with one surface. In other words, the lens mirror array 20 has a plurality of lines of grooves 27 which divide the reflecting surface, between the upstream-side reflecting surfaces 23 of the plurality of optical elements 21.

The lens mirror array 20 has a surface portion that does not contribute to guiding the effective light between the plurality of grooves 27 and the plurality of emitting-side lens surfaces 25. This surface portion includes an inclined surface 28 continuous with bottom surfaces of the plurality of grooves 27, and a surface 29 continuous with an end side of the inclined surface 28 separated from the grooves 27 to be connected to the plurality of emitting-side lens surfaces 25. The inner surface of the groove 27 is also a surface portion that does not contribute to guiding the effective light. The inclined surface 28 and the surface 29 are planar surfaces extending over the entire length of the lens mirror array 20. The ridge portion between the inclined surface 28 and the surface 29 extends in a straight line in the main scanning direction and projects outward of the lens mirror array 20.

Each of the plurality of optical elements 21 has the emitting-side lens surface 25 continuous with an end side of the surface 29 separated from the inclined surface 28. In addition, each of the plurality of optical elements 21 has the downstream-side reflecting surface 24 on the surface of the optical element. The optical element 21 has a surface portion 206, which does not contribute to guiding the effective light required for exposure, between the second pillar surface 2222 of the incident surface 22 and the downstream-side reflecting surface 24. The surface portion 206 is a substantially planar surface extending over the entire length of the lens mirror array 20.

The lens mirror array 20 has flange portions 205 continuously with the end sides separated from the surface 29 of the plurality of emitting-side lens surfaces 25. The flange portion 205 extends over the entire length of the lens mirror array 20. The flange portion 205, for example, abuts on the inner surface of the housing 54 of the exposure device 504 to position the lens mirror array 20 on the housing 54.

The optical element 21 has the light shielding film 26 on the above-mentioned surface portion that does not contribute to guiding the effective light. The light shielding film 26 is formed by applying a light shielding material to the above-mentioned surface portion by using a dispenser, an inkjet head, or the like. The light shielding material is, for example, an ink having a high light shielding property (for example, a UV ink containing carbon black or a light shielding material such as a pigment or a dye) using a polymer having substantially the same refractive index as the lens mirror array 20 as a base material. The light shielding film 26 prevents the light propagating in the lens mirror array 20 from being reflected and being emitted to the outside of the lens mirror array 20.

The lens mirror array 20 according to at least one embodiment has the light shielding film 26 on the inner surface, the inclined surface 28, and the surface 29 of each of the plurality of grooves 27. The light shielding film 26 may be provided on the surface portion 206 between the second pillar surface 2222 and the downstream-side reflecting surface 24. If the light shielding film 26 is formed on the inner surface of the groove 27, for example, the light shielding material is injected into the groove 27 by the dispenser, and the light shielding material is applied to the inner surface of the groove 27 due to the capillary phenomenon of the groove 27, wetting spread, or the like. In this way, if the light shielding film 26 is applied to the inner surface of the groove 27 by utilizing the capillary phenomenon, wetting spread, or the like, an appropriate amount of the light shielding material can be continuously and quickly applied, the work can be simplified, and the light shielding material can be uniformly applied to each of the optical elements 21.

An imaginary boundary surface (cross sections in FIGS. 6 to 8) between the two optical elements 21 adjacent to each other in the main scanning direction is a plane orthogonal to the main scanning direction and is a surface substantially orthogonal to each of the above-mentioned surfaces 22 (221, 222), 23, 24, 25, 28, and 29. Each of the surfaces 22 (221, 222), 23, 24, 25, 28, and 29 of the optical elements 21 is a surface substantially along the longitudinal direction of the lens mirror array 20. That is, in the lens mirror array 20 in which the plurality of optical elements 21 are integrally connected in the main scanning direction, each of the surfaces 22 (221, 222), 23, 24, 25, 28, and 29 of the optical elements 21 becomes a continuous surface connected in the main scanning direction.

Hereinafter, the functions of the lens mirror array 20 will be described by exemplifying the case where the lens mirror array 20 is incorporated into the exposure device 504. For example, if the lens mirror array 20 is incorporated into the exposure device 504, the lens mirror array 20 is fixedly attached to the housing 54 in a posture where the incident surfaces 22 of the plurality of optical elements 21 face the light source 51 (FIG. 4).

The light emitted from the light source 51 is incident on the incident surfaces 22 of the plurality of optical elements 21. That is, the diffused light from the light source 51 placed at the object point O is incident on the incident surface 22. If it is assumed that the light source 51 is a linear light source extending in the main scanning direction, the object points O are a plurality of points linearly aligned in the main scanning direction.

Of the light incident on the incident surface 22, the effective light required for exposure is incident on the lens mirror array 20 through the incident-side lens surfaces 221 of the plurality of optical elements 21 as illustrated in FIG. 10. The incident-side lens surface 221 of each of the optical elements 21 condenses the incident diffused light and forms an intermediate inverted image.

An upstream-side reflecting surface 23 reflects the effective light incident through the incident-side lens surface 221 toward the downstream-side reflecting surface 24 by total reflection or Fresnel reflection. The downstream-side reflecting surface 24 further reflects the effective light reflected by the upstream-side reflecting surface 23 toward the emitting-side lens surface 25 by total reflection or Fresnel reflection. The downstream-side reflecting surface 24 may be formed by a planar surface.

The emitting-side lens surface 25 emits the effective light reflected by the downstream-side reflecting surface 24 toward the surface of the photoreceptor drum 314 arranged at the imaging point F. In this case, the imaging points F are also a plurality of points linearly aligned in the main scanning direction. The emitting-side lens surface 25 cooperates with the downstream-side reflecting surface 24 to form the erect image which is an inverted image of the intermediate inverted image formed by the incident-side lens surface 221. The effective light emitted from the emitting-side lens surface 25 is imaged on the surface of the photoreceptor drum 314 arranged at the imaging point F.

By the way, in addition to the above-mentioned effective light, the unnecessary light unnecessary for exposure is also incident on the incident surface 22 of each of the optical elements 21. For example, the unnecessary light may be incident on the lens mirror array 20 through at least one of the first pillar surface 2221 and the second pillar surface 2222 adjacent to the incident-side lens surface 221 of the incident surface 22. Such unnecessary light is refracted and reflected on each of the surfaces of the lens mirror array 20 to become stray light and is mixed with the above-mentioned effective light emitted toward the surface of the photoreceptor drum 314 through the emitting-side lens surface 25, so that the mixed light may become noise light.

Therefore, in at least one embodiment, the unnecessary light incident on at least one of the first pillar surface 2221 and the second pillar surface 2222 is condensed toward the light shielding film 26 to suppress the stray light, and thus, the problem that noise light is mixed with the effective light that forms an image on the surface of the photoreceptor drum 314 is prevented. In other words, in at least one embodiment, the first and second pillar surfaces 2221 and 2222 are provided adjacent to the incident-side lens surface 221, and the first and second pillar surfaces 2221 and 2222 are formed in a shape capable of directing the unnecessary light incident on the first and second pillar surfaces 2221 and 2222 toward the light shielding film 26.

Figure 11:
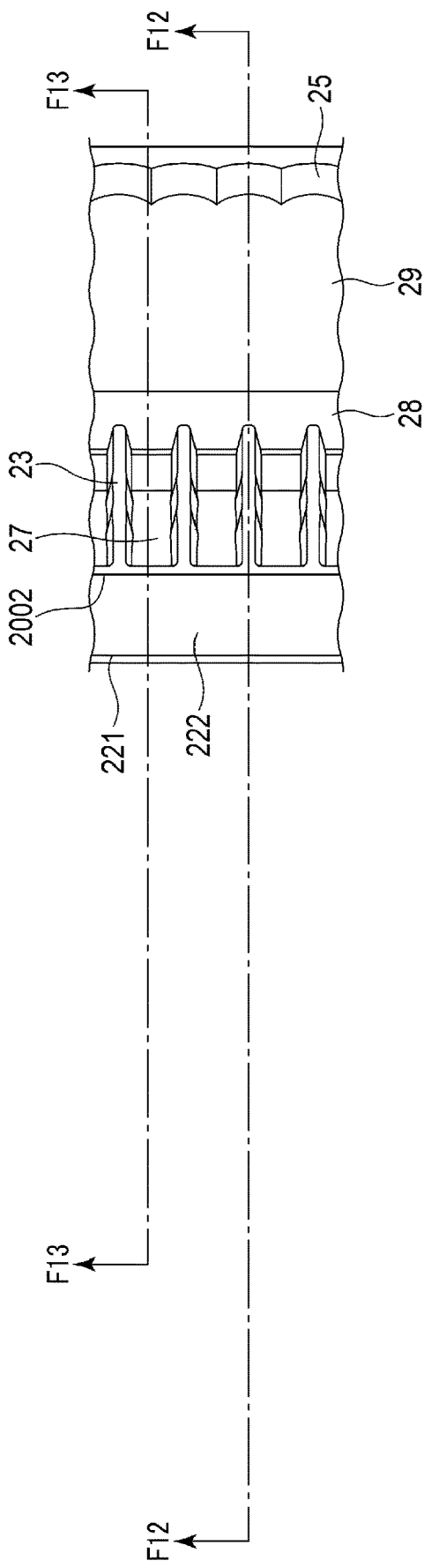
FIG. 11 is a plan view illustrating a portion of the lens mirror array of FIG. 3.
Figure 12:
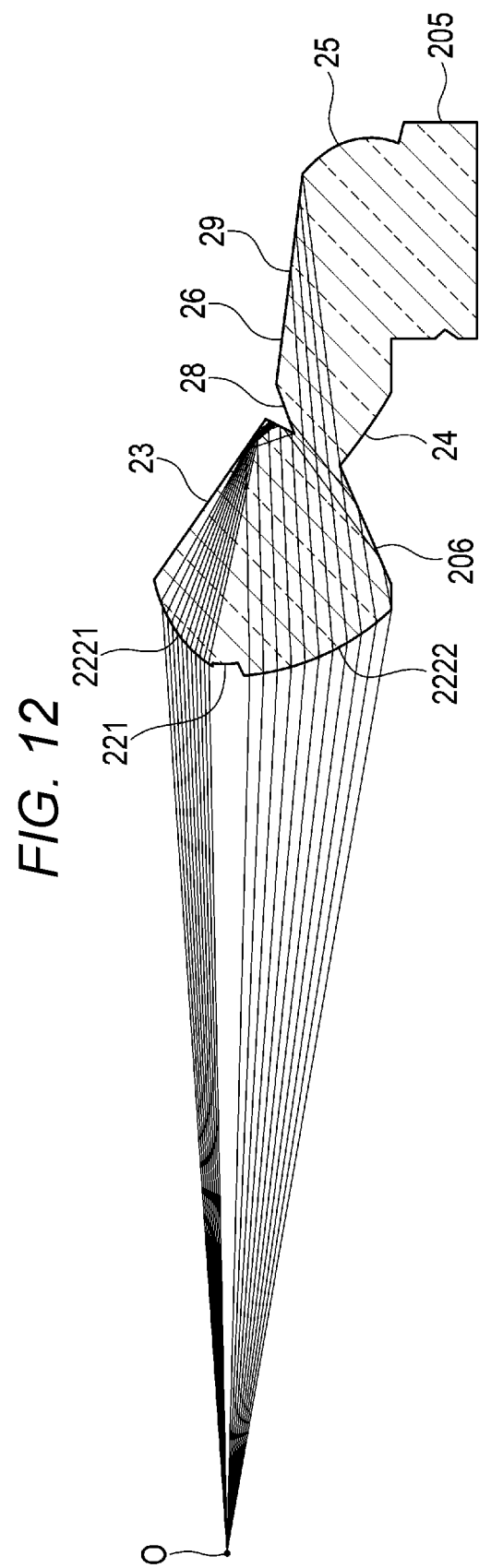
FIG. 12 is a cross-sectional view of the lens mirror array of FIG. 11 taken along line F12-F12.
Figure 13:
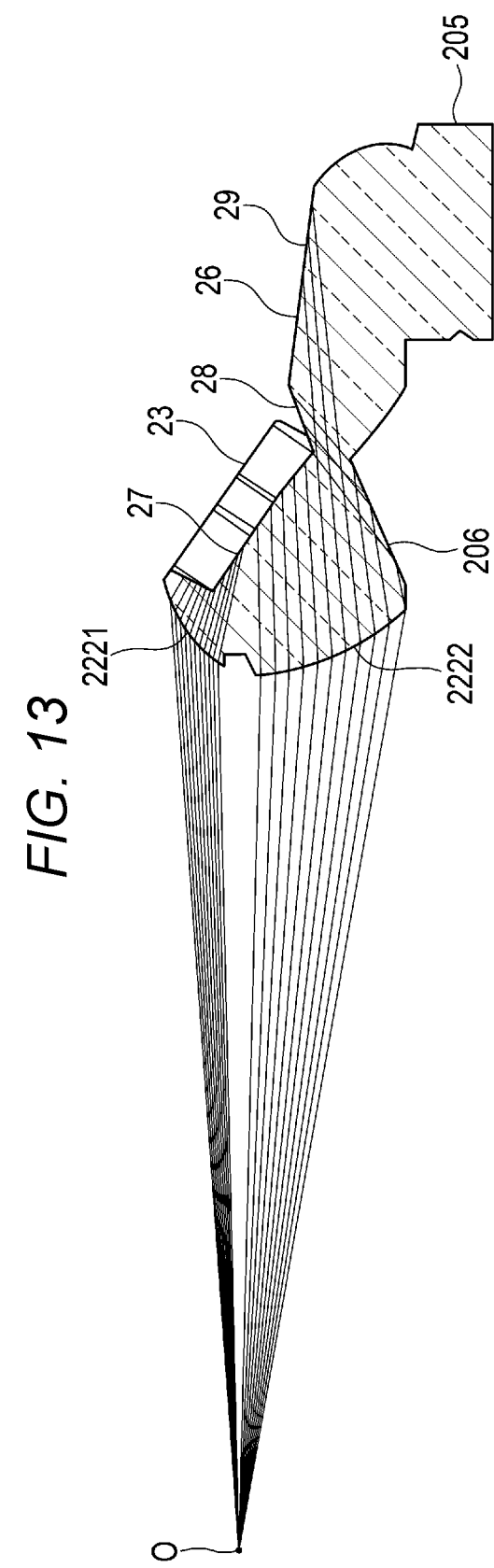
FIG. 13 is a cross-sectional view of the lens mirror array of FIG. 11 taken along line F13-F13.
Figure 14:
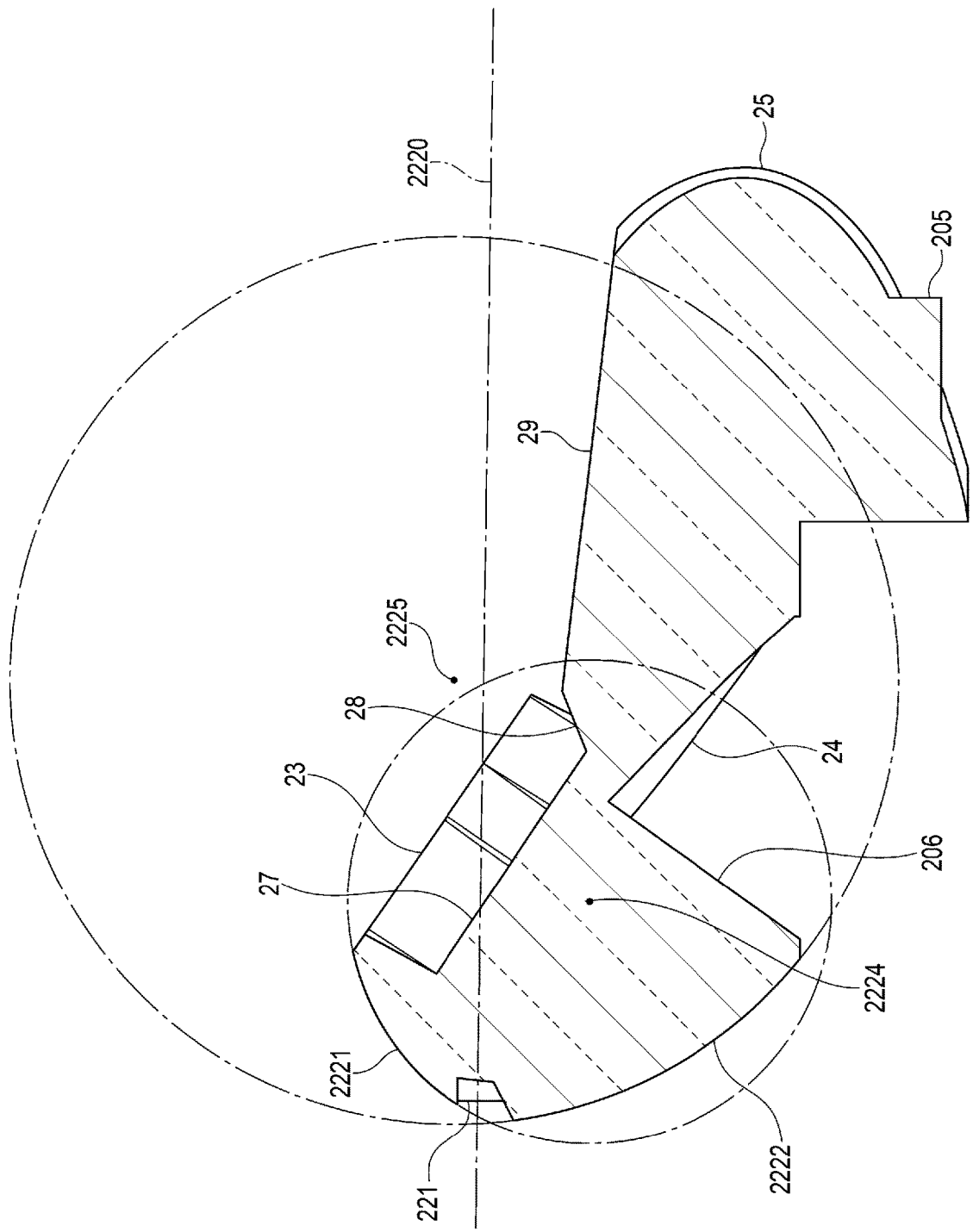
FIG. 14 is a cross-sectional view illustrating shapes of first and second pillar surfaces of the lens mirror array of FIG. 3.

Hereinafter, a light guide path of unnecessary light incident on the lens mirror array 20 through the first and second pillar surfaces 2221 and 2222 will be described with reference to FIGS. 11 to 14. FIG. 11 is a plan view illustrating four consecutive optical elements 21 in the main scanning direction of the lens mirror array 20. FIG. 12 is a cross-sectional view of one optical element 21 taken along the line F12-F12 at the center in the main scanning direction. FIG. 13 is a cross-sectional view of the lens mirror array 20 taken along the line F13-F13 at an imaginary interface between the two optical elements 21 consecutive in the main scanning direction. FIG. 14 is a diagram illustrating the shapes of the first pillar surface 2221 and the second pillar surface 2222.

As illustrated in FIGS. 12 and 13, the first pillar surface 2221 refracts and condenses the unnecessary light incident on the first pillar surface 2221 downward in the drawing deviated from the upstream-side reflecting surface 23. For this reason, the unnecessary light incident on the first pillar surface 2221 is directed to the light shielding film 26 applied to the inner surface of the comb-teeth-shaped groove 27 and the light shielding film 26 applied to the inclined surface 28. After being reflected by the upstream-side reflecting surface 23, a portion of the unnecessary light is directed to the light shielding film 26 applied to the inner surface of the comb-teeth-shaped groove 27.

As illustrated in FIG. 14, the first pillar surface 2221 has a shape in which a curve in which a plane (cross section in the drawing) orthogonal to the main scanning direction intersects the first pillar surface 2221 overlaps a portion of a circle centered on a point 2224 on the second pillar surface 2222 side from the optical axis 2220 of the effective light. In this manner, by setting the shape of the first pillar surface 2221, the unnecessary light incident on the first pillar surface 2221 can be directed downward in the drawing, and thus, the unnecessary light can be guided to the light shielding film 26.

In addition, as illustrated in FIGS. 12 and 13, the second pillar surface 2222 refracts the unnecessary light incident on the second pillar surface 2222 toward the light shielding film 26 to condense the light. For this reason, the unnecessary light incident on the second pillar surface 2222 is applied to the light shielding film 26 applied to the inner surface of the comb-teeth-shaped groove 27, the light shielding film 26 applied to the inclined surface 28, and the light shielding film 26 applied to the surface 29. After being reflected by the surface portion 206, a portion of the unnecessary light is directed to the light shielding film 26 applied to the inner surface of the comb-teeth-shaped groove 27 and the light shielding film 26 applied to the inclined surface 28.

As illustrated in FIG. 14, the second pillar surface 2222 has a shape in which a curve in which a plane (cross section in the drawing) orthogonal to the main scanning direction intersects the second pillar surface 2222 overlaps a portion of a circle centered on a point 2225 on the first pillar surface 2221 side from the optical axis 2220 of the effective light. In this manner, by setting the shape of the second pillar surface 2222, the unnecessary light incident on the second pillar surface 2222 can be directed upward in the drawing, and thus, the unnecessary light can be guided to the light shielding film 26.

In addition, since the first pillar surface 2221 is on the same side as the upstream-side reflecting surface 23 with respect to the optical axis 2220, the curvature is allowed to be large in order to greatly refract the unnecessary light so as not to be incident on the upstream-side reflecting surface 23. On the other hand, since the second pillar surface 2222 is on the opposite side of the upstream-side reflecting surface 23 with respect to the optical axis 2220, the curvature is allowed to be small in order not to greatly refract the unnecessary light so as not to be incident on the upstream-side reflecting surface 23.

As described above, according to at least one embodiment, since the unnecessary light incident on the first and second pillar surfaces 2221 and 2222 adjacent to the incident-side lens surface 221 is guided to the light shielding film 26, it is possible to effectively block the stray light which causes noise light. That is, according to at least one embodiment, it is possible to provide the lens mirror array 20 having good optical characteristics.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in at least one embodiment, the case where the directional lens surface 222 that guides the unnecessary light to the light shielding film 26 is provided only to the incident surface 22 has been described, but in addition to this, another directional lens surface may be provided to the other portion of the surface of the lens mirror array 20. However, it is effective to provide the directional lens surface 222 to the incident surface 22 on which light is incident, and it is effective to provide the directional lens surface 222 side by side to the incident-side lens surface 221.

In addition, in at least one embodiment, the case where the light shielding film 26 that blocks the unnecessary light is provided only on the inner surface, the inclined surface 28, and the surface 29 of the plurality of grooves 27 has been described, but in addition to this, other light shielding films 26 may be provided on other portions of the surface of the lens mirror array 20. For example, the light shielding film can be provided on the surface portion 206 between the second pillar surface 2222 of the incident surface 22 and the downstream-side reflecting surface 24. By increasing the area where the light shielding film 26 is provided, the degree of freedom in shape and arrangement position of the directional lens surface 222 can be increased.

In addition, as the light shielding portion for blocking the unnecessary light, in addition to the above-mentioned light shielding film 26, a structure capable of providing a light shielding function on the surface portion of the lens mirror array 20 may be used. For example, separate pieces of component having a light shielding function may be produced, and the separate piece of component may be adhered to the lens mirror array 20 by using an optical adhesive having almost the same refractive index so as to prevent air from entering between the boundaries and causing reflection.

In addition, in at least one embodiment, the case where the incident-side lens surface 221 of each of the optical elements 21 is set as a free curved surface has been described, but the invention is not limited thereto, and the incident-side lens surface 221 may be set as a spherical surface. In addition, in at least one embodiment, the case where the first pillar surface 2221 and the second pillar surface 2222 are set as cylindrical surfaces has been described, but the invention is not limited thereto, the first and second pillar surfaces 2221 and 2222 may be set as free curved surfaces.

What is claimed is:

1. A lens mirror array comprising a plurality of optical elements, an optical element of the plurality of optical elements comprising:
    an incident surface on which light is incident;
    an emitting surface configured to emit the light incident through the incident surface;
    at least one reflecting surface reflecting the light incident through the incident surface toward the emitting surface;
    a light shielding portion configured to block the light; and
    wherein the incident surface comprises:
        an effective surface configured to pass effective light emitted from the emitting surface, the effective light being light out of the light incident on the incident surface; and
        a directional surface configured to direct unnecessary light to the light shielding portion, the unnecessary light being stray light out of the light incident on the incident surface; and
    wherein the directional surface is a free curved surface adjacent to the effective surface and projecting to an outside of the optical element so as to condense light incident on the directional surface toward the light shielding portion, wherein the free curved surface has a shape different from that of the effective surface.

2. The array of claim 1,
    wherein the directional surface comprises:
        a cylindrical first pillar surface adjacent to a first side of the effective surface in a direction intersecting a main scanning direction, and
        a cylindrical second pillar surface arranged adjacent to a second side of the effective surface in the intersecting direction,
        wherein the first pillar surface curves along a plane orthogonal to the main scanning direction, wherein the curve is concentric with a point on the second pillar surface side of an optical axis of light incident on the effective surface, and
    wherein the second pillar surface curves along the plane orthogonal to the main scanning direction, wherein the curve is concentric with a point on the first pillar surface side from the optical axis.

3. The array of claim 2, wherein the main scanning is a direction in which the plurality of optical elements are integrally connected.

4. The array of claim 1, wherein the at least one reflecting surface comprises an upstream-side reflecting surface and a downstream-side reflective surface, wherein the upstream-side reflecting surface reflects the effective light toward the downstream-side reflecting surface and the downstream-side reflecting surface reflects the effective light toward an emitting-side lens surface.

5. The array of claim 4, wherein the emitting-side lens surface is configured to emit light incident through the incident surface.

6. An image forming apparatus comprising:
    a lens mirror array having a plurality of optical elements, an optical element of the plurality of optical elements comprising:
        an incident surface on which light is incident;
        an emitting surface configured to emit the light incident through the incident surface;
        at least one reflecting surface reflecting the light incident through the incident surface toward the emitting surface;
        a light shielding portion configured to block the light;
        wherein the incident surface comprises:
            an effective surface configured to pass effective light emitted from the emitting surface, the effective light being light out of the light incident on the incident surface; and
            a directional surface configured to direct unnecessary light to the light shielding portion, the unnecessary light being stray light out of the light incident on the incident surface;
        wherein the directional surface of the lens mirror array is a free curved surface adjacent to the effective surface and projecting to an outside of the optical element so as to condense light incident on the directional surface toward the light shielding portion, wherein the free curved surface has a shape different from that of the effective surface; and wherein the lens mirror array is configured to guide reflected light from a document surface;

an image sensor configured to receive the reflected light from the document surface guided through the lens mirror array and output an image signal; and an image forming device configured to form an image based on the image signal output from the image sensor.

7. The image forming apparatus of claim 6, further comprising: a second lens mirror array; a light source emitting light based on the image signal, wherein the second lens mirror array is configured to guide the light from the light source; a photoreceptor drum having a surface on which an electrostatic latent image is formed by receiving the light based on the image signal guided through the second lens minor array; and a developing device configured to supply a developing agent to the electrostatic latent image formed on the surface of the photoreceptor drum and to develop the electrostatic latent image.

8. The image forming apparatus of claim 6, wherein the image is formed by irradiating a photosensitive medium with light based on the image signal guided through the lens mirror array.

9. The image forming apparatus of claim 6, wherein the directional surface comprises:
a cylindrical first pillar surface adjacent to a first side of the effective surface in a direction intersecting a main scanning direction, and
a cylindrical second pillar surface arranged adjacent to a second side of the effective surface in the intersecting direction,
wherein the first pillar surface curves along a plane orthogonal to the main scanning direction, wherein the curve is concentric with a point on the second pillar surface side of an optical axis of light incident on the effective surface, and
wherein the second pillar surface curves along the plane orthogonal to the main scanning direction, wherein the curve is concentric with a point on the first pillar surface side from the optical axis.

10. The image forming apparatus of claim 9, wherein the main scanning is a direction in which the plurality of optical elements are integrally connected.

11. The image forming apparatus of claim 6, wherein the at least one reflecting surface comprises an upstream-side reflecting surface and a downstream-side reflective surface, wherein the upstream-side reflecting surface reflects the effective light toward the downstream-side reflecting surface and the downstream-side reflecting surface reflects the effective light toward an emitting-side lens surface.

12. The image forming apparatus of claim 11, wherein the emitting-side lens surface is configured to emit light incident through the incident surface.

13. A lens mirror array comprising a plurality of optical elements, an optical element of the plurality of optical elements comprising:
an incident surface on which light is incident;
an emitting surface configured to emit the light incident through the incident surface;
at least one reflecting surface reflecting the light incident through the incident surface toward the emitting surface;
a light shielding portion configured to block the light; and
wherein the incident surface comprises:
an effective surface configured to pass effective light emitted from the emitting surface, the effective light being light out of the light incident on the incident surface; and
a directional surface configured to direct unnecessary light to the light shielding portion, the unnecessary light being stray light out of the light incident on the incident surface;
wherein the directional surface comprises:
a cylindrical first pillar surface adjacent to a first side of the effective surface in a direction intersecting a main scanning direction, and
a cylindrical second pillar surface arranged adjacent to a second side of the effective surface in the intersecting direction,
wherein the first pillar surface curves along a plane orthogonal to the main scanning direction, wherein the curve is concentric with a point on the second pillar surface side of an optical axis of light incident on the effective surface, and
wherein the second pillar surface curves along the plane orthogonal to the main scanning direction, wherein the curve is concentric with a point on the first pillar surface side from the optical axis.

14. The array of claim 13, wherein the main scanning is a direction in which the plurality of optical elements are integrally connected.

15. The array of claim 13, wherein the at least one reflecting surface comprises an upstream-side reflecting surface and a downstream-side reflective surface, wherein the upstream-side reflecting surface reflects the effective light toward the downstream-side reflecting surface and the downstream-side reflecting surface reflects the effective light toward an emitting-side lens surface.

16. The array of claim 15, wherein the emitting-side lens surface is configured to emit light incident through the incident surface.

* * * * *